W. W. EDWARDS.
BUMPER BAR FENDER.
APPLICATION FILED JAN. 17, 1921.
1,423,604.
Patented July 25, 1922.
2 SHEETS—SHEET 1.
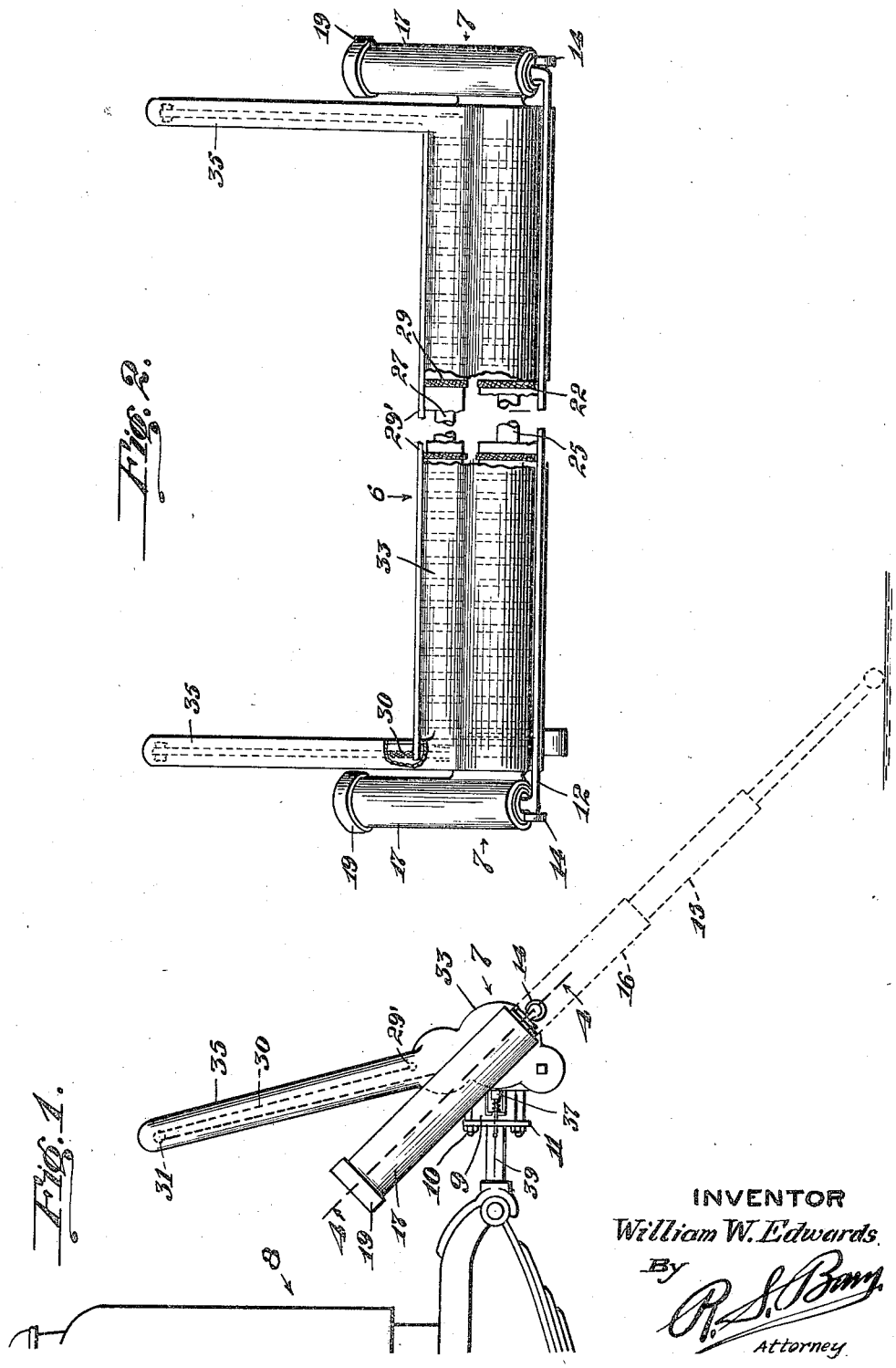
INVENTOR
William W. Edwards
By
Attorney W. W. EDWARDS.
BUMPER BAR FENDER.
APPLICATION FILED JAN. 17, 1921.
1,423,604.
Patented July 25, 1922.
2 SHEETS—SHEET 2.
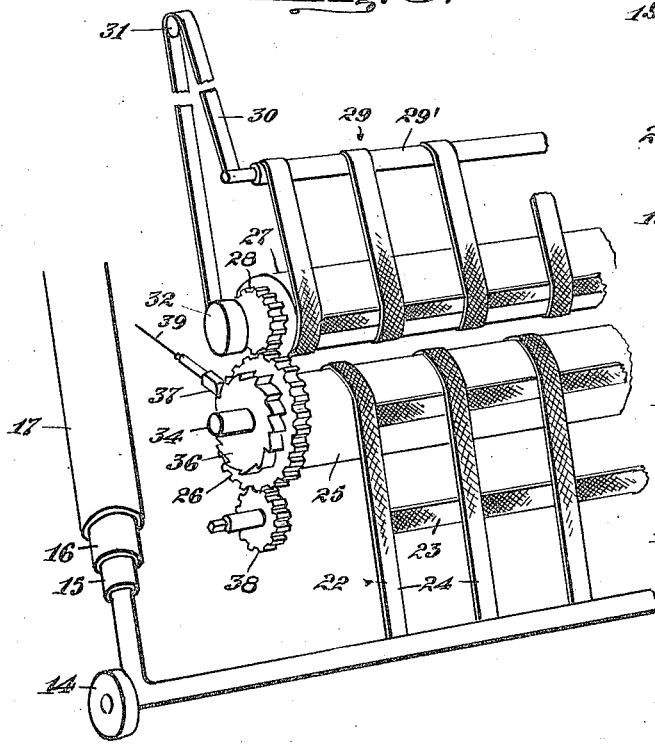
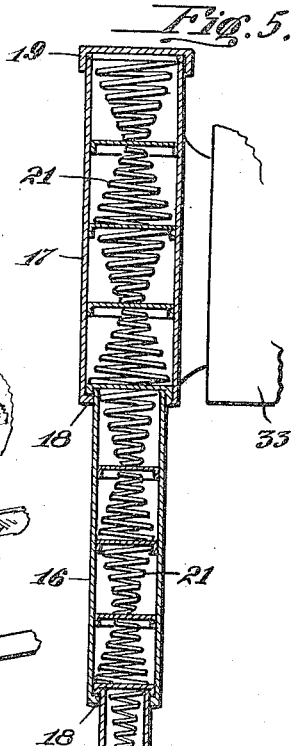
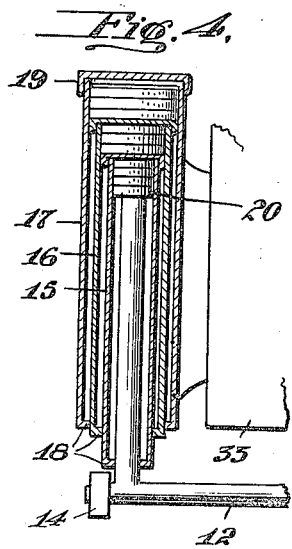
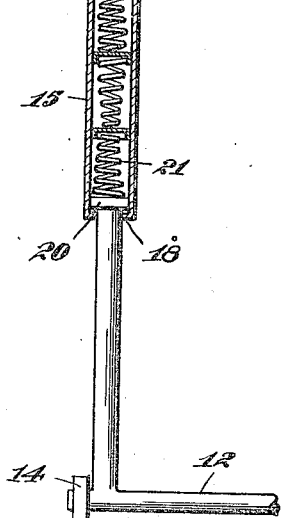
INVENTOR
William W. Edwards:
By R. S. Berry
Attorney.

UNITED STATES PATENT OFFICE.

WILLIAM W. EDWARDS, OF LOS ANGELES, CALIFORNIA.

BUMPER-BAR FENDER.

1,423,604. Specification of Letters Patent. Patented July 25, 1922.

Application filed January 17, 1921. Serial No. 437,753.

*To all whom it may concern:*

Be it known that I, WILLIAM W. EDWARDS, a citizen of the United States, residing at Los Angeles, in the county of Los Angeles and State of California, have invented new and useful Improvements in Bumper-Bar Fenders, of which the following is a specification.

This invention relates to a vehicle fender, and particularly pertains to a fender which is especially applicable for use on automobiles and vehicles of similar character.

It is the object of this invention to provide a fender which is adapted to be normally maintained in a rolled position so as not to protrude forward of the vehicle when its use is not required, but which may be quickly ejected into an operative position when occasion requires and act to prevent the body of a person being thrown beneath the wheels of the vehicle in event a pedestrian should be unable to escape being struck by the vehicle.

Another object is to provide a mechanism for actuating the fender which will occupy compact space and may be carried on the bumper bar with which auto vehicles are ordinarily equipped, and which is so constructed that it may be readily controlled by the driver of the vehicle to cause the fender to be speedily thrown into an extended operative position.

The accompanying drawings illustrate a fender constructed in accordance with this invention as applied to an automobile, in which:

Figure 1 is a view in side elevation showing the fender in its retracted position.

Figure 2 is a plan view of this fender showing a portion of the casing broken away to disclose parts beneath.

Figure 3 is a detail in perspective showing one end portion of the fender with the casing removed and illustrating the fender actuating mechanism.

Figure 4 is a view in section as seen on the line 4—4 of Figure 1 with the fender in its retracted position.

Figure 5 is a similar view showing the fender in its extended position.

More specifically, 6 indicates a telescopic fender frame which comprises two telescopic members 7—7 adapted to be secured to an automobile 8 in any suitable manner, but here shown as secured to the bumper bar 9 by the studs 10 and the strap iron 11; and a rigid front portion 12 having its ends turned at right angles and entering the telescopic members 7—7, and slidably engaging therewith. This front portion of the fender frame is provided with rollers 14 which permit the fender to contact with the road as the car is moving. The telescopic members may be comprised of any number of suitable concentric parts, but are here shown as comprising three tubular concentric sections 15, 16, and 17; the sections 15 and 16 each being provided with a flange at one end to retain it upon respective shoulders 18 of the adjacent member, the upper section 17 having its end closed by a cap 19. The end of the front portion 12 is formed with a flange 20 adapted to engage the shoulder 18 of the lower telescoping section 15. Thus all telescoping parts are held together but are adapted to reciprocate within the adjoining section, the end of the front portion being adapted to be withdrawn up into the section 15. Each of the three telescoping members is provided with a series of conical coil springs 21, between each two springs a loose disc being interposed to hold the springs in position. When the telescoping parts are forced into their retracted position, as shown in Figure 4, the springs are closed until they occupy a space equal only to the thickness of the wire of which they are formed, the discs coming together as shown in Figure 4 to completely enclose these coiled springs. A flexible fender 22 is secured at one end to the front portion 12 of the fender frame. This fender may be of any suitable construction or form, but is here shown as made up of transverse strips of fabric 23 secured to longitudinal strips 24 to form a strong net work construction adapting the fender to be rolled up in compact form. A roller 25 to which the other end of this fender is secured is provided around which the fender is normally wound when not in use. This roller is provided with a gear wheel 26 fixed thereto. Another fender roller 27 is provided also having a gear wheel 28 which engages the gear 26 and is rotated thereby. Another fender 29 similar to that described but somewhat shorter is wound upon the roller 27 and is secured at its other end to a rigid bar 29'. A belt 30 is secured to either end of this bar 29' and passes over a pulley 31 and returns downward and is secured to a reel 32 which is fixed to the gear wheel 28 and rotated thereby. Thus when the lower fender is unrolled the gear wheel 26 rotates the gear wheel 28 and causes the reel 32 to wind up the belt 30 thereby unwinding the upper fender, these parts being so adjusted that when the upper fender is unwound the belt 30 is held taut as is also the attached fender 29, the belt tending to pull in one direction and thus tending to rotate the roller in the other direction thereby holding all parts locked against further unrolling.

A casing 33 is provided to cover the fenders when rolled up as well as all moving parts and to support some of these parts as will appear. The rollers are each provided with extended shafts 34 supported by and adapted to rotate freely in this casing as shown in section in Figure 2. This casing has two extension portions 35 of tubular form extending upward on either side at a slight angle from the vertical plane to provide a housing for the belt 30 and formed with a slot to serve as a guide for either end of the bar 29, the pulley 31 being rotatably mounted on the upper ends of these extensions. A ratchet wheel 36 is fixed to the lower fender roller and a pawl 37 is pivotally mounted upon the casing so as to engage the ratchet 36 to hold it against reverse rotation and to hold the fenders in their retracted rolled-up position.

Meshing with the gear wheel 26 is another gear wheel 38 provided with a square shank adapted to engage a crank, not shown. By rotating this gear wheel the rollers 25 and 27 are rotated in reverse directions rolling up the fenders as they rotate and drawing the front portion of the fender frame upward. This causes the members 15, 16, and 17 to telescope within one another and when the fenders are completely rolled up, as shown in Figure 2, the front portion of the fender is drawn up to the casing and enters a slot provided in the casing, all parts then being retracted in a compact form, as shown in Figures 2 and 4, respectively. This rolling up of the fenders and retracting of the parts is done against the tension of the springs 21, thus storing up energy in these springs for the purpose of causing the fenders to be automatically and rapidly returned to their extended position. As this winding up is in progress the pawl 37 drops with each successive detent of ratchet wheel 36 to prevent the fenders from being unrolled should the operator release the crank. The pawl then holds the parts against the tension of the springs.

In the application of this device, the fender is mounted upon a suitable front portion of an automobile or the vehicle upon which it is to be employed, and a suitable connection, such as a wire, 39, is connected to the pawl and terminates at the dashboard, steering wheel, or other suitable point within reach of the motorist's hand or foot so that the pawl may be readily drawn out of engagement with the ratchet.

When the motorist sights a pedestrian apparently unable to escape from being struck by the vehicle the pawl is caused to be drawn out of engagement with the ratchet. The energy stored upon the coil springs propels the lower portion of the fender frame outward rapidly unrolling the upper and lower fender, as described until the shoulders of the telescoping parts come in contact with the respective flanges bringing all parts to rest in a fully projected position. In this manner a strong fender spanning the entire exposed front of the car is instantly provided in emergency, but is normally held in a compact space. This fender may also be used to prevent collision with objects encountered in the road that might otherwise damage the vehicle. The lower portion of the fender may be employed as a unit without the upper fender. This lower fender is principally introduced to prevent pedestrians from being thrown beneath the wheel and the car, and the upper fender is designed to prevent contact with the upper parts of the vehicle.

I claim:

1. In a vehicle fender, a frame embodying telescopic side portions, each of which comprises a plurality of tubes adapted to be telescoped together, a series of helical springs arranged in each tube adapted to act on the adjacent tubes, said springs being compressed when the tubes are in their telescoped position, means for holding the tubes telescoped in opposition to the springs adapted to be released, and a fender carried by said telescoping members adapted to be moved into operative position on extension of said telescoping members.

2. In a vehicle fender, the combination of a frame adapted to be retracted into compact form, a roller, a ratchet fixed to said roller, a pawl engaging said ratchet, a flexible screen secured to said frame and adapted to be wound upon said roller, resilient means on said frame adapted to normally hold said screen in a fully extended position, means for rotating said roller to cause said flexible screen to be wound about said roller to draw said frame into retracted form, and means for releasing said pawl whereby the said resilient means will project said frame outward to its extended operative position.

3. In a vehicle fender, the combination of a frame having a rigid front portion and telescopic side portions, springs disposed in said side portions to normally hold it in an extended position, a roller, a flexible screen secured to said rigid front portion of said frame and adapted to be wound upon said roller, means for rotating said roller whereby said screen will be wound upon said roller and said telescopic side portions of said frame will be retracted into compact form, means for holding said roller against rotation, and means for releasing said roller whereby said resilient means will force said telescopic side portions of said frame to a fully advanced position.

4. In a vehicle fender, the combination of a frame adapted to be retracted into compact form, a roller, a ratchet fixed to said roller, a pawl engaging said ratchet, a flexible screen secured to said frame and adapted to be wound upon said roller, resilient means on said frame adapted to normally hold it in a fully extended position, means for rotating said roller to cause said flexible screen to be wound about said roller to draw said frame into retracted form, means for releasing said pawl whereby the said resilient means will project said frame outward to its extended position, another roller adapted to be rotated by said first roller, a flexible screen wound thereon, and means whereby both screens will be advanced and retracted simultaneously.

5. In a vehicle fender, the combination of a frame having a rigid front portion and telescopic side portions, springs disposed in said side portions to normally hold it in an extended position, a roller, a flexible screen secured to said frame and adapted to be wound upon said roller, means for rotating said roller whereby said screen will be wound upon said roller and said telescopic portion of said frame will be retracted into compact form, means for holding said roller against rotation, means for releasing said roller whereby said resilient means will force said telescopic portion of said frame to a fully advanced position; another roller adapted to be rotated by said first roller, a flexible screen wound thereon, and means whereby both screens will be advanced and retracted simultaneously.

6. In a vehicle fender, the combination of a frame having a rigid front portion and telescopic side portions, springs disposed in said side portions to normally hold it in an extended position, a roller, a flexible screen secured to said frame and adapted to be wound upon said roller, means for rotating said roller whereby said screen will be wound upon said roller and said telescopic portion of said frame will be retracted into compact form, means for holding said roller against rotation, means for releasing said roller whereby said resilient means will force said telescopic portion of said frame to a fully advanced position; another roller adapted to be rotated by said first roller, a flexible screen wound thereon, means whereby both screens will be advanced and retracted simultaneously, and a casing adapted to cover all of said parts when in their retracted position.

WILLIAM W. EDWARDS.